(12) United States Patent
Sauer

(10) Patent No.: US 7,431,342 B2
(45) Date of Patent: Oct. 7, 2008

(54) THREADED CONNECTION

(75) Inventor: Helmut Sauer, Amtzell (DE)

(73) Assignee: Ciret Holdings AG, Wangen (DE)

( * ) Notice: Subject to any disclaimer, the term of this patent is extended or adjusted under 35 U.S.C. 154(b) by 268 days.

(21) Appl. No.: 11/082,490

(22) Filed: Mar. 17, 2005

(65) Prior Publication Data

US 2005/0232691 A1 Oct. 20, 2005

(30) Foreign Application Priority Data

Apr. 16, 2004 (DE) .................. 10 2004 019 237

(51) Int. Cl.
*F16L 55/00* (2006.01)
(52) U.S. Cl. ............................ 285/92; 285/86; 285/317; 403/286
(58) Field of Classification Search ................ 285/316, 285/317, 86, 91, 92, 921; 403/286, 293, 403/307
See application file for complete search history.

(56) References Cited

U.S. PATENT DOCUMENTS

| 1,531,463 | A | * | 3/1925 | Vincent | ................... | 403/286 |
| 1,580,694 | A | * | 4/1926 | Smith | ................... | 285/86 |
| 5,188,398 | A | * | 2/1993 | Parimore et al. | ........ | 285/86 |
| 5,215,336 | A | * | 6/1993 | Worthing | .............. | 285/92 |

* cited by examiner

*Primary Examiner*—Aaron M Dunwoody
(74) *Attorney, Agent, or Firm*—Burr & Brown

(57) ABSTRACT

The invention relates to a connection for fastening a tool or a tool adapter to an extension device. The connection includes a threaded stud, a threaded bush and a mechanism for locking the threaded stud to the threaded bush when the threaded stud and threaded bush are interconnected. The mechanism for locking is one of a snap connection and a sliding connection and includes a manipulating device to release the locking mechanism.

13 Claims, 5 Drawing Sheets

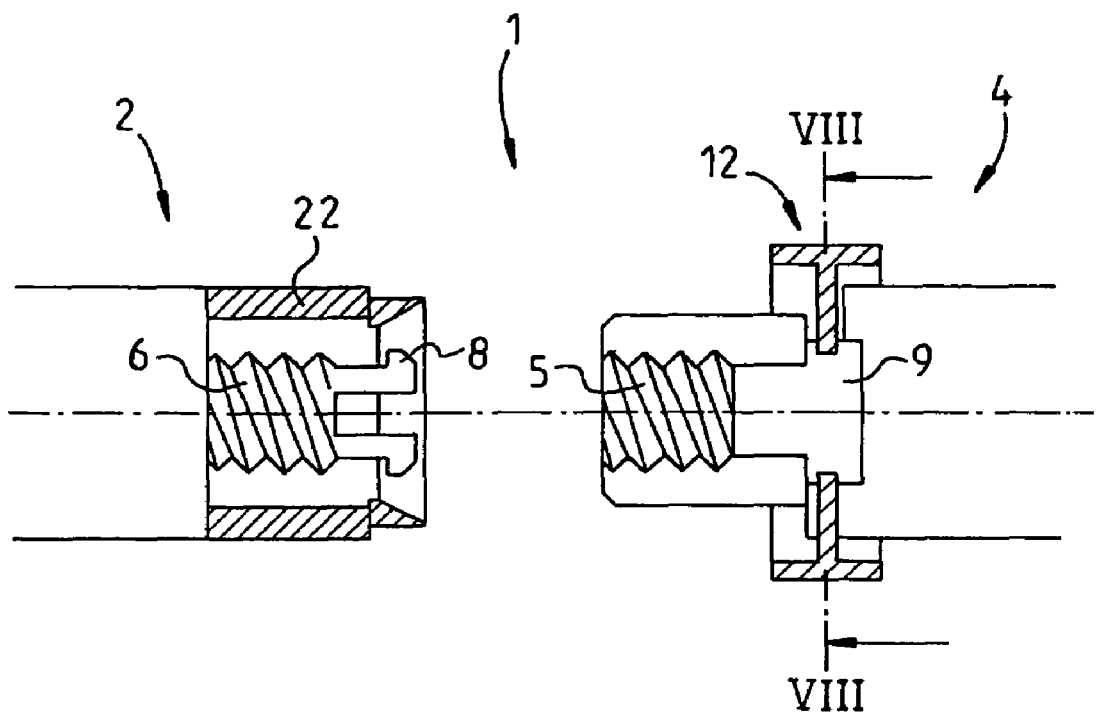
Fig. 8
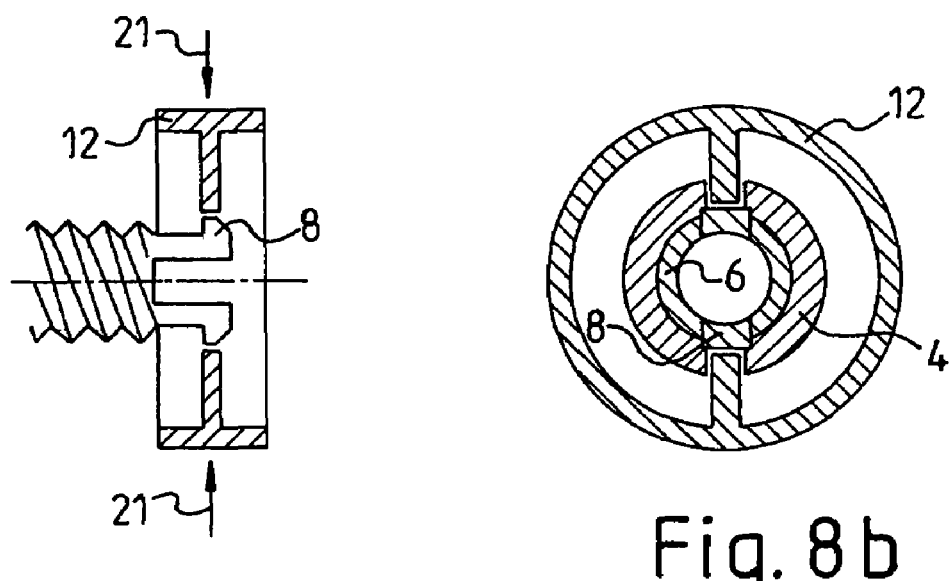
Fig. 8a
Fig. 8b

THREADED CONNECTION

FIELD OF THE INVENTION

The present invention relates to a threaded connection for fastening and securing a tool or tool adapter to an extension device.

BACKGROUND OF THE INVENTION

In order to be able to operate tools, in particular paint rollers, more effectively, it is known to connect these tools to an extension device. As a result, the paint roller can be held and guided not only on the handle formed on it but also advantageously over the entire region of the extension device.

As a connection between the paint roller and the extension device, it is known to use a threaded connection. That part of the threaded connection which is assigned to the paint roller may be arranged either directly in the handle of the paint roller or on a corresponding adapter on which a paint roller or another tool may be arranged. The complementary part of the threaded connection is formed on the extension device.

During operation of the paint roller, however, the threaded connection repeatedly works loose, which has an adverse effect on the manipulation of the paint roller.

SUMMARY OF THE INVENTION

The object of the invention is therefore to improve the ease-of-operation of the threaded connection.

This object is achieved by locking the tool or tool adaptor to the extension device using a sliding or snap positive connection. Advantageous and expedient improvements on the sliding or snap positive connection are specified below.

According to the invention, a threaded connection is therefore proposed, the essence of which lies in the fact that the tool or the tool adapter is locked on the extension device by means of a positive snap connection.

The advantage of such a locking arrangement lies in the fact that, when the paint roller is being used, rotary movements can also be transmitted to it relative to the longitudinal axis of the extension device without the threaded connection working loose.

In a preferred embodiment, the locking arrangement of the threaded connection is designed as a snap mechanism having two elements which interlock in a positive manner and can be fitted into one another while temporarily overcoming elastic resetting forces.

In this resetting/elastic connection, at least one of the locking elements is offset or deformed only briefly and then returns again into its original position and/or shape.

In an embodiment which is modified in contrast thereto, however, the locking, positive connection may also be designed as a sliding connection, e.g. without elastic resetting forces. In this case, fixing is effected by displacement of the corresponding locking element, so that it interacts with its mating piece.

In a development, the snap connection may consist of a lug, a nose or the like and a recess having a corresponding matching shape. To this end, the lug is advantageously oriented relative to the recess in such a way that they both snap accurately into place one inside the other when the threaded connection consisting of threaded stud and threaded bush moves into the screwed-tight position when being screwed together.

An elastic abutment may also be advantageously provided for forming an elastic transition when the threaded stud is being secured in the threaded bush, this abutment, for example, being in a rubber form which either dampens the tightening torque or widens the region in which the threaded stud is secured in the threaded bush. This region relates to both the axial offset and the radial offset of the threaded stud relative to the threaded bush, so that a greater tolerance can be achieved as a result when securing the lug in the recess.

In order to be able to release the snap connection again, in a next embodiment said snap connection may comprise a manipulating device, such as, for example, an actuating lever, a gripping surface or the like. By actuation of the manipulating device, the locking is neutralized and the tool can be separated again from the extension device.

To this end, the manipulating device may be of spring-loaded design or may itself form a good hold in order to facilitate the separating operation.

In an especially preferred embodiment, the lug and/or the recess may be axially displaceable in order to produce the locking effect of the snap connection or neutralize it again. This is preferably done by means of a locking sleeve which is displaceable against the force of an elastic resetting means, in particular a spring. In this case, either the lug or the recess may be formed on the locking sleeve. In a special embodiment, it is also possible, in addition to a first locking arrangement, for a second locking arrangement in the form of interacting lugs and recesses to be formed, e.g. for reinforcing the locking. In this case, it is advantageous if the two locking arrangements are designed in such a way that their lugs can latch in place in the respectively associated recess only in a clearly assigned manner. This can ensure that a complete thread lead, that is to say a virtually 360° rotation of the threaded stud in the threaded bush, can be made possible, for prestressing the locking arrangement by displacing the locking sleeve, before the lugs latch in place in the associated recesses and secure the threaded connection in a rotationally fixed manner.

In an especially preferred embodiment, the lug can act in an axially displacing manner on the locking sleeve when the threaded stud is being screwed into the threaded bush. In this case, the lug may be arranged on both the locking sleeve and the corresponding mating piece.

In order to ensure that the locking sleeve remains fixed in its rotary position relative to the threaded-connection element assigned to it when the threaded connection is being screwed together, an anti-rotation locking means can be designed for it. In the displacement direction, a stop provides for the restriction of the freedom of movement. In this case, the stop is preferably designed to be spring-loaded in the form of a clamping pin. This permits simple fitting of the locking sleeve, for example on the extension device.

In an embodiment of the locking arrangement modified in contrast thereto, a locking means can also perform a radial offset during its actuation and engage in its mating piece. The lug and/or the recess of the snap connection may additionally have a beveled edge or surface. The beveled edge or surface thus makes it easier to neutralize the locking effect of the snap connection when a rotary force is acting, although it has to be ensured that the locking force is still sufficiently large, so that satisfactory manipulation of the paint roller is ensured.

Possible embodiments in this case are designs in which the lug snaps radially outward or inward into place in the correspondingly associated recess. A combination of such embodiments is of course also possible.

A further embodiment may be realized, for example, by the recess being designed as a groove or hole. The advantage that the groove may have over the hole is that it may be of encircling design, so that greater production tolerances are also admissible as a result. The advantage that the hole may have over the groove is that it can be of simpler design if need be.

BRIEF DESCRIPTION OF THE DRAWINGS

Further details and advantages of the invention are described in the drawings with reference to schematically illustrated exemplary embodiments.

FIGS. 6a, 6b, 7, 8, 8a, 8b show various embodiments of locking arrangements and manipulating devices which release said locking arrangements again.

DETAILED DESCRIPTION OF THE INVENTION

Figure 1:
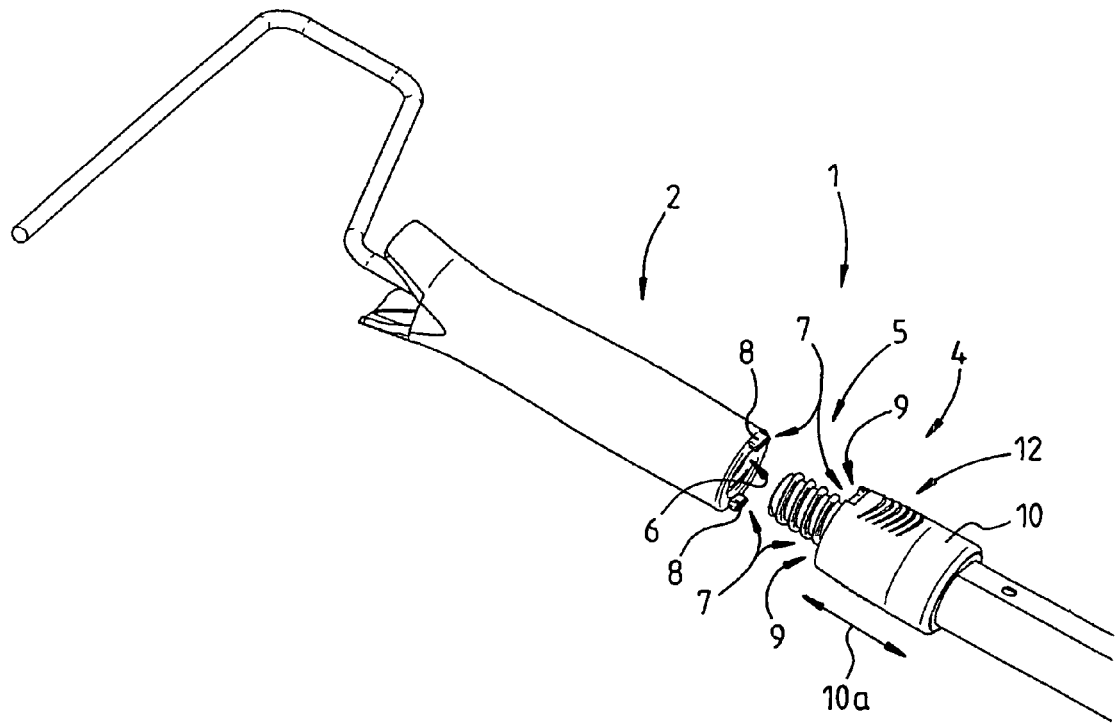
FIG. 1 shows a general overall view of a threaded connection for fastening a tool, which is a paint roller in the example shown, to an extension device.

FIG. 1 shows a threaded connection 1 between a tool 2 and an extension device 4. In the present case, the tool 2 is a paint roller, a threaded bush 6 being attached to that end face of its handle which is opposite the stirrup for the paint roller. A threaded stud 5 of the extension device 4 can be screwed into this threaded bush 6 until the extension device 4 is firmly connected to the tool 2.

Designed as a locking arrangement for the threaded connection 1 is a positive snap connection 7 which has a lug 8 on the tool side and a recess 9, assigned to the lug, on the side of the extension device 4.

Two snap connections 7 arranged radially approximately opposite one another are shown in FIG. 1. In order to be able to latch the lugs 8 in place in the recesses 9, the locking sleeve 10 can be displaced to the right in a spring-loaded manner in accordance with arrow direction 10a when the extension device 4 is being screwed together with the handle of the tool 2. If the locking sleeve 10, which is rotationally fixed but axially displaceable relative to the extension device, is rotated relative to the tool to such an extent that the recess assigned to the lug 8 is in alignment with the lug 8, it snaps back again under spring force against the direction of the displacement movement performed beforehand and accommodates the lug 8 in order to lock the threaded connection 1. Further details can be seen from FIGS. 3 and 4.

In order to facilitate the release of the snap connection 7, a manipulating device 12 is formed on the locking sleeve 10, by means of which manipulating device 12 it can be pulled back again axially to the right in the direction of the arrow 10a, so that the engagement of the lug 8 in the recess 9 is neutralized, whereupon the extension device 4 can again be rotated relative to the tool in the opposite direction and can thus be unscrewed.

Figure 2:
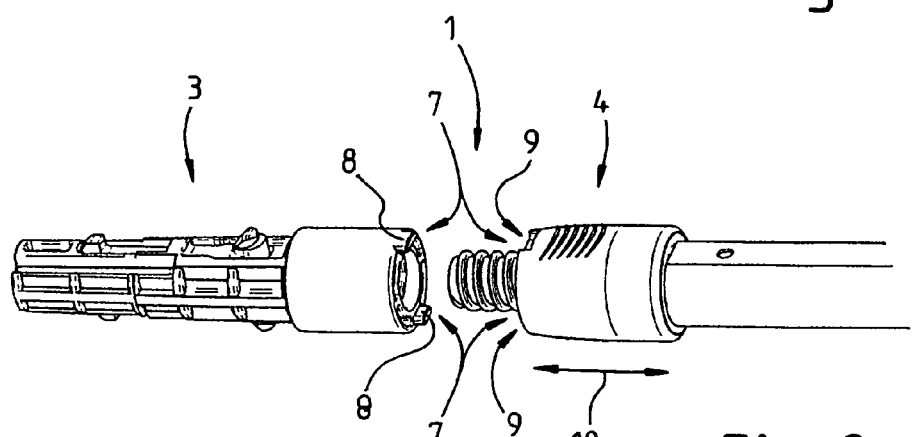
FIG. 2 shows a threaded connection as in FIG. 1, but, instead of a tool, an adapter for a tool.

FIG. 2 shows basically the same construction of a threaded connection 1 with threaded stud 5 and threaded bush 6 and also a locking arrangement in the form of a positive snap connection 7. The difference between FIGS. 1 and 2 lies in the fact that a tool 2 is accommodated by the extension device 4 in FIG. 1 and a tool adapter 3 is accommodated by the extension device 4 in FIG. 2. This tool adapter 3 expands the options for varying the threaded connection 1.

Figure 3:
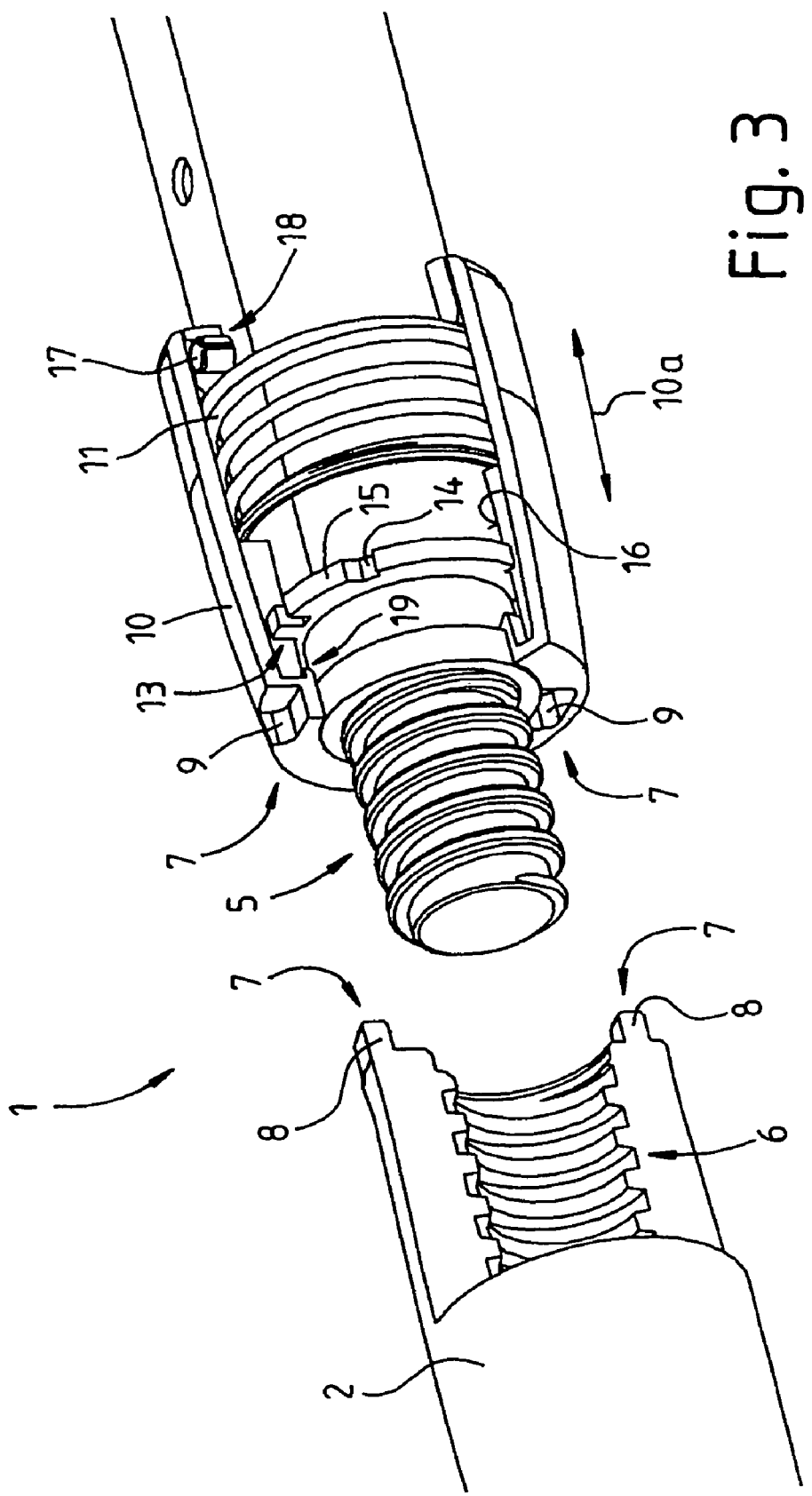
FIG. 3 shows a sectional illustration of the threaded connection in the separated state of the two threaded parts.

FIG. 3 shows further details of the threaded connection. In order to ensure that the locking sleeve 10 does not rotate relative to the longitudinal axis of the extension device 4 when the threaded stud 5 is being screwed into the threaded bush 6, this locking sleeve 10 has an anti-rotation locking means 13. This anti-rotation locking means is formed between a slot 14 arranged in a retaining ring 15 and a rib 16 engaging in this slot. In this case, the retaining ring 15 is connected to the extension device 4 in a rotationally fixed manner.

The locking sleeve 10 can therefore only be displaced in the axial direction by displacing the rib 16 in the slot 14 against the spring force of the spring 11, which in turn is axially supported against the spring-loaded clamping pin 17 inserted radially into the extension device 4. In addition, the locking sleeve 10 has two stops 18, 19, the stop 18 being formed opposite the clamping pin 17 as a flange arranged on the end face of the locking sleeve and pointing inward. The stop 19 is formed opposite the retaining ring 15 on that end face of the locking sleeve 10 which is opposite this end face, again as a flange pointing radially inward. The locking sleeve can therefore be axially displaced between these two stop positions.

The two snap connections 7 are designed in such a way that each lug 8, due to different radial distances from the longitudinal axis of the threaded connection in each case, can only latch in place in the recess 9 assigned to it.

Figure 4:
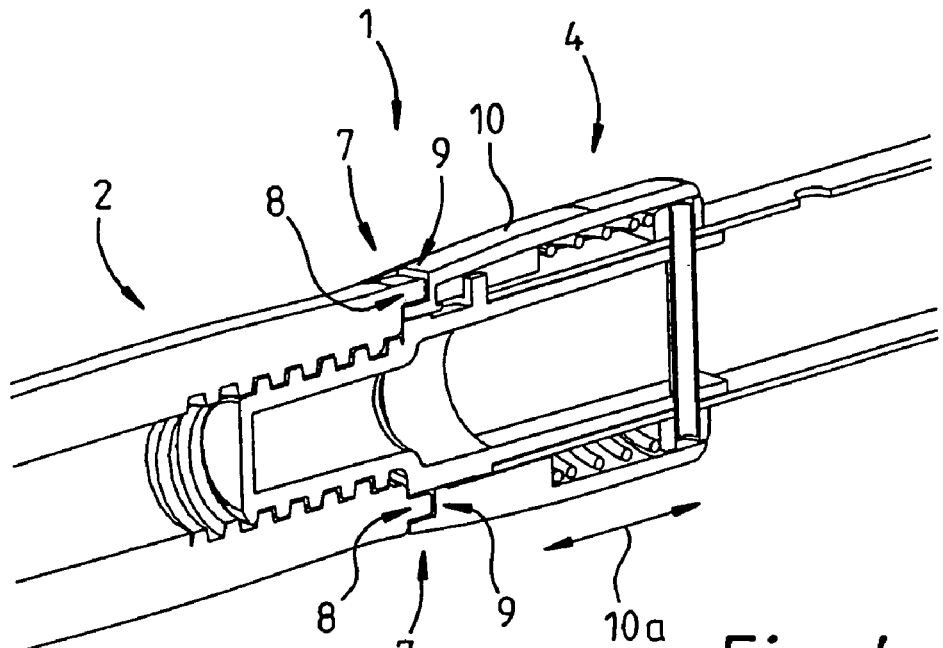
FIGS. 4 and 5 each show an oblique plan view of a threaded connection in the locked state in a sectioned illustration (FIG. 4) and in an illustration which is not sectioned (FIG. 5)

FIG. 4 now shows this connection in the locked, that is to say fitted-together, state. Here, too, it can be seen that the top snap connection 7, as described in FIG. 3, differs from the bottom snap connection 7.

Figure 5:
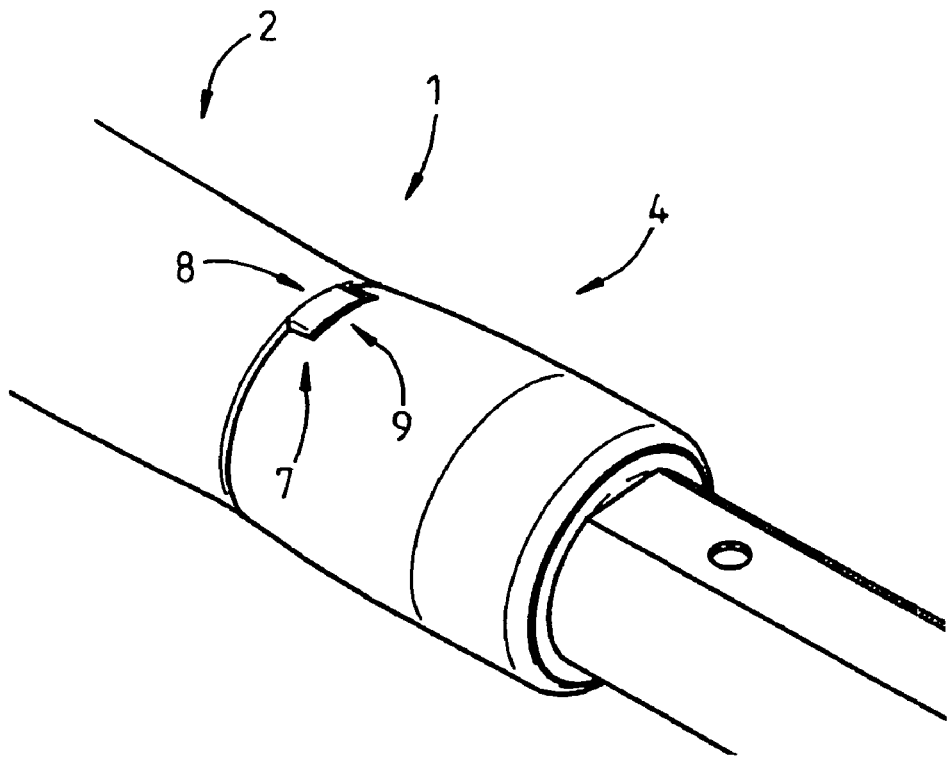

FIG. 5 shows this threaded connection in an oblique plan view in an illustration which is not sectioned. The design of the locking arrangement by the positive snap connection 7 by means of the lug 8, which is latched in place in the recess 9 assigned to it, can again be easily seen.

Figure 6A:
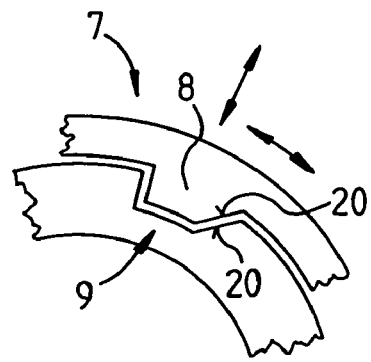
Figure 6B:
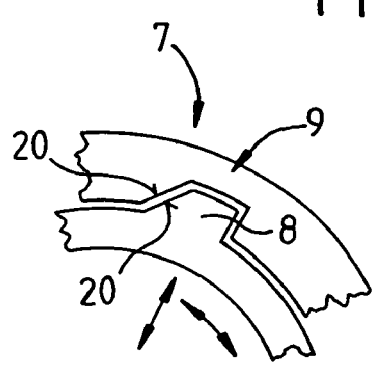

FIGS. 6a and 6b, as partial details, show further possibilities for an elastic snap connection in which a lug 8 is again latched in place in a recess 9 belonging to it. Compared with the above embodiment, however, provision is made here for the locking to be effected by rotating the lug on the surface, assigned to the recess, of the mating piece. To this end, the locking element having the lug must be elastically deformed temporarily relative to the locking element having the recess 9 until the two locking elements interlock by snapping into place. In order to facilitate release of this locking arrangement, both the lug 8 and the recess 9 have a respective beveled surface 20 in these two embodiments 6a and 6b. This beveled surface 20 relates to the cross section of the exemplary embodiment shown. Of course, these surfaces are two opposite beveled surfaces which reduces the resetting force during the release of the locking arrangement to such an extent that it is easy to release and yet satisfactorily secures the tool during use of the latter.

According to the illustration in FIG. 6a, the snap connection is designed in such a way that the lug 8 snaps radially inward into place in the recess, and, according to the illustration in FIG. 6b, this lug snaps radially outward into place in the recess 9 assigned to it.

Figure 7:
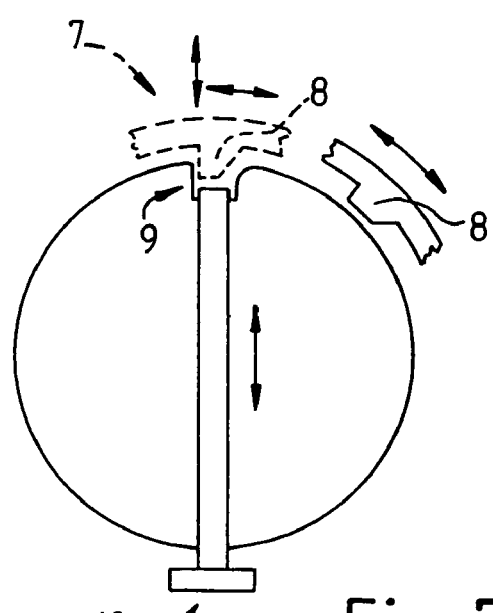

FIG. 7 shows a further embodiment in which the lug 8 snaps radially inward into place in the recess assigned to it. Arranged here for the release is a manipulating device 12 which presses the lug from the inside outward from the radially opposite side, so that the locking arrangement is released. In addition, that side of the recess 9 which is assigned to the edge 20 is also rounded off here, so that the release of the locking arrangement is facilitated.

FIGS. 8, 8a and 8b show a further embodiment of a locking arrangement for a threaded connection. In this case, by way of example, the threaded stud 6 is arranged in the interior of the handle for the tool 2 and, if need be, may be surrounded by a sleeve 22 in order to form a handle end which is easier to operate. Lugs 8 are arranged on elastic tongues on the end face of the threaded stud 6, so that said lugs 8 can be bent radially inward. When the threaded stud 6 is being screwed into the threaded bush 5, first the lugs 8 are inserted and pressed together radially inward. When the threaded stud has been fully screwed into place in the threaded bush 5, the lugs 8 snap radially outward into place in the associated recess 9. This recess 9 may now be an encircling groove or holes arranged at appropriate locations. These holes may be drilled holes, cutouts or something similar.

To release this locking arrangement, a manipulating device 12 is again provided and in this case is designed in the form of a ring which has pins pointing inward. According to the illustration in FIG. 8a, these pins, when the ring is pressed together, press the two lugs 8 together radially in the direction of the arrows 21, so that said lugs 8 can be screwed out again axially in the direction of the threaded bush 5.

The illustration in FIG. 8b is a sectional illustration in the plane VIII-VIII in FIG. 8.

Even further embodiments of a locking arrangement are of course conceivable, so that the embodiments shown here are only to be regarded by way of example and are not to be regarded as restrictive.

For example, the sliding connection may be realized by a modified form of the snap connection 7, in which the locking sleeve 10 is arranged on the threaded connection 1 without the resetting spring 11. The interlocking of the lugs 8 and the recess 9, for the purpose of locking the tool 2 on the extension device 4, is then effected in this embodiment not by displacing the locking sleeve by means of a spring but by manual displacement.

While the present invention has been particularly shown and described with reference to the preferred mode as illustrated in the drawings, it will be understood by one skilled in the art that various changes in detail may be effected therein without departing from the spirit and scope of the invention as defined by the claims.

LIST OF DESIGNATIONS

1 Threaded connection
2 Tool
3 Tool adapter
4 Extension device
5 Threaded stud
6 Threaded bush
7 Snap connection
8 Lug
9 Recess
10 Locking sleeve
10a Arrow
11 Spring
12 Manipulating device
13 Anti-rotation locking means
14 Slot
15 Retaining ring
16 Rib
17 Clamping pin
18 Stop
19 Stop
20 Beveled edge
21 Arrow
22 Sleeve

What is claimed:

1. A connection for fastening a tool or a tool adapter to an extension device, the connection comprising:
   a threaded stud;
   a threaded bush;
   at least one lug on one of said threaded stud and said threaded bush; and
   a locking sleeve on the other one of said threaded stud and said threaded bush, said lockinig sleeve having at least one recess corresponding to said at least one lug, said locking sleeve being axially displaceable against the force of a spring contained inside said locking sleeve but being rotationally fixed by anti-rotation means contained inside said locking sleeve,
   wherein said at least one lug snaps into place in said at least one recess in a locking manner only when said threaded stud is screwed into a tightened position in said threaded bush, and
   wherein said at least one lug is retracted from said at least one recess when said locking sleeve is displaced axially away from said lug.

2. The connection of claim 1, wherein said lug axially displaces said locking sleeve when said connection is being screwed together.

3. The connection of claim 1, wherein said locking sleeve has at least one stop in the displacement direction, one of said stops preferably being designed as a spring-loaded clamping pin.

4. The connection of claim 1, wherein at least one of said lug and said recess has a beveled edge which, with sufficient action of force, by rotation of said tool or said tool adapter against said extension device, neutralizes the locking effect of said locking sleeve.

5. The connection of claim 1, wherein said lug snaps radially inward into place in said recess.

6. The connection of claim 1, wherein said lug snaps radially outward into place in said recess.

7. The connection of claim 1, wherein said recess is designed as a groove.

8. The connection of claim 1, wherein said recess is designed as a hole.

9. The connection of claim 1, wherein said anti-rotation means comprises: (i) a longitudinally extending rib formed on one of an inside surface of said locking sleeve and an outside surface of said other one of said threaded stud and said threaded bush, and (ii) a slotted ring formed on the other one of said inside surface of said locking sleeve and an outside surface of said other one of said threaded stud and said threaded bush.

10. A connection for fastening a tool or a tool adapter to an extension device, the connection comprising:
   a threaded stud;
   a threaded bush;
   only two lugs on one of said threaded stud and said threaded bush; and
   a locking sleeve on the other one of said threaded stud and said threaded bush, said locking sleeve having only two recesses corresponding to said two lugs, said locking sleeve being axially displaceable against the force of a spring contained inside said locking sleeve but being rotationally fixed by anti-rotation means contained inside said locking sleeve.
   wherein said two lugs snap into place in said two recesses only when said threaded stud is screwed into a tightened position in said threaded bush, and wherein said two lugs are retracted from said two recesses when said locking sleeve is displaced axially away from said lugs 11. The connection of claim 10, wherein said anti-rotation means comprises: (i) a longitudinally extending rib formed on one of an inside surface of said locking sleeve and an outside surface of said other one of said threaded stud and said threaded bush, and (ii) a slotted ring formed on the other one of said inside surface of said locking sleeve and an outside surface of said other one of said threaded stud and said threaded bush.

12. An extendable paint roller comprising:
a paint roller or paint roller adapter;
an extension device, and
a connection connecting said paint roller or paint roller adapter to said extension device, wherein said connection comprises:
a threaded stud;
a threaded bush;
at least one lug on one of said threaded stud and said threaded bush; and
a locking sleeve on the other one of said threaded stud and said threaded bush, said locking sleeve having at least one recess corresponding to said at least one lug, said locking sleeve being axially displaceable against the force of spring contained inside said locking sleeve but being rotationally fixed by anti-rotation means contained inside said locking sleeve, wherein said at least one lug snaps into place in said at least one recess in a locking manner only when said threaded stud is screwed into a tightened position in said threaded bush, and wherein said at least one lug is retracted from said at least one recess when said locking sleeve is displaced axially away from said lug.

13. The extendable paint roller of claim 12, wherein said anti-rotation means comprises: (i) a longitudinally extending rib formed on one of an inside surface of said locking sleeve and an outside surface of said other one of said threaded stud and said threaded bush, and (ii) a slotted ring formed on the other one of said inside surface of said locking sleeve and an outside surface of said other one of said threaded stud and said threaded bush.

* * * * *

UNITED STATES PATENT AND TRADEMARK OFFICE
CERTIFICATE OF CORRECTION

PATENT NO. : 7,431,342 B2  Page 1 of 1
APPLICATION NO. : 11/082490
DATED : October 7, 2008
INVENTOR(S) : Helmut Sauer It is certified that error appears in the above-identified patent and that said Letters Patent is hereby corrected as shown below:

<u>Column 6</u>
  *Line 9*: change "1ocking" to --locking--
  *Line 62*: change "sleeve." to --sleeve,--

<u>Column 7</u>
  *Line 3*: add --.-- after "lugs"

<u>Column 8</u>
  *Line 2*: change "1ocking" to --locking--
  *Line 3*: add --a-- after "force of"

Signed and Sealed this

Sixth Day of January, 2009

JON W. DUDAS
*Director of the United States Patent and Trademark Office*